(12) United States Patent
Lu

(10) Patent No.: US 9,263,029 B2
(45) Date of Patent: Feb. 16, 2016

(54) INSTANT COMMUNICATION VOICE RECOGNITION METHOD AND TERMINAL

(71) Applicant: Tencent Technology (Shenzhen) Company Limited, Shenzhen, Guangdong (CN)

(72) Inventor: Yisha Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/382,122

(22) PCT Filed: Mar. 1, 2013

(86) PCT No.: PCT/CN2013/072086
§ 371 (c)(1),
(2) Date: Aug. 29, 2014

(87) PCT Pub. No.: WO2013/127367
PCT Pub. Date: Sep. 6, 2013

(65) Prior Publication Data
US 2015/0039298 A1 Feb. 5, 2015

(30) Foreign Application Priority Data
Mar. 2, 2012 (CN) .......................... 2012 1 0053628

(51) Int. Cl.
*G10L 15/26* (2006.01)
*G10L 15/00* (2013.01)
(Continued)

(52) U.S. Cl.
CPC ................ *G10L 15/00* (2013.01); *G10L 13/00* (2013.01); *G10L 15/22* (2013.01); *H04L 51/04* (2013.01);
(Continued)

(58) Field of Classification Search
CPC ......... G10L 15/22; G10L 13/00; G10L 15/00; G10L 2015/225; G10L 15/30; G10L 15/26; H04L 51/04; H04L 51/10; H04L 2250/74

USPC .............. 704/260, 270.1, 226, 235, 267, 270, 704/258, 268, 257, 275, 211, 9
See application file for complete search history.

(56) References Cited

U.S. PATENT DOCUMENTS 5,012,519 A * 4/1991 Adlersberg et al. ........... 704/226
5,740,320 A * 4/1998 Itoh .............................. 704/267
(Continued)

FOREIGN PATENT DOCUMENTS

CN 101079836 A 11/2007
CN 101098309 A 1/2008
(Continued)

OTHER PUBLICATIONS

Written Opinion of the ISA PCT/CN2013/072086; dates Jun. 6, 2013; 9 pages.
(Continued)

*Primary Examiner* — Vijay B Chawan
(74) *Attorney, Agent, or Firm* — Knobbe Martens Olson & Bear LLP

(57) ABSTRACT

The present disclosure discloses a speech recognition method and a terminal, which belong to the field of communications. The method comprises: receiving speech information inputted by a user; acquiring the current environment information, and judging whether the speech information needs to be played according to the current environment information; and recognizing the speech information as text information, when it is judged that the speech information needs not to be played. The terminal comprises an acquisition module, a judgment module and a recognition module. The present disclosure provides the speech receiver with a speech recognition function, when the speech information of the instant messaging is received by the terminal, it can help the receiver to normally acquire the content to be expressed by the speech sender under an inconvenient situation.

11 Claims, 3 Drawing Sheets

(51) Int. Cl.
    *G10L 13/00*     (2006.01)
    *H04L 12/58*     (2006.01)
    *G10L 15/22*     (2006.01)
    *G10L 15/30*     (2013.01)

(52) U.S. Cl.
    CPC ............... *H04L 51/10* (2013.01); *G10L 15/26* (2013.01); *G10L 15/30* (2013.01); *G10L 2015/225* (2013.01); *H04M 2203/4536* (2013.01); *H04M 2250/74* (2013.01)

(56) References Cited

U.S. PATENT DOCUMENTS

| | | | | |
|---|---|---|---|---|
| 5,845,047 | A * | 12/1998 | Fukada et al. | 704/268 |
| 5,890,117 | A * | 3/1999 | Silverman | 704/260 |
| 5,911,129 | A * | 6/1999 | Towell | 704/270.1 |
| 6,098,040 | A * | 8/2000 | Petroni et al. | 704/234 |
| 8,862,474 | B2 * | 10/2014 | Burke et al. | 704/270 |
| 2010/0121636 | A1 * | 5/2010 | Burke et al. | 704/233 |
| 2011/0137660 | A1 * | 6/2011 | Strommer et al. | 704/500 |
| 2011/0227931 | A1 * | 9/2011 | Lu et al. | 345/473 |
| 2012/0134480 | A1 * | 5/2012 | Leeds et al. | 379/88.12 |
| 2013/0013315 | A1 * | 1/2013 | Burke et al. | 704/270 |
| 2014/0177813 | A1 * | 6/2014 | Leeds et al. | 379/67.1 |

FOREIGN PATENT DOCUMENTS

| | | |
|---|---|---|
| CN | 101453611 A | 6/2009 |
| JP | 2002-185569 A | 6/2002 |
| JP | 2004-219918 A | 8/2004 |
| JP | 2005-078427 A | 3/2005 |
| JP | 2007-520943 A | 7/2007 |
| JP | 2011-250475 A | 12/2011 |
| KR | 10-2011-0100620 | 9/2011 |

OTHER PUBLICATIONS

International Search Report; PCT/CN2013/072086; dated Jun. 6, 2013; 6 pages.

Office Action Issued in Korean Application No. KR10-2014-7027277, dated Aug. 31, 2015.

Office Action Issued in Japanese Application No. JP2014-559078, dated Sep. 1, 2015.

* cited by examiner

INSTANT COMMUNICATION VOICE RECOGNITION METHOD AND TERMINAL

CROSS-REFERENCE TO RELATED APPLICATIONS

This application is the U.S. National Phase application under 35 U.S.C. § 371 of International Application PCT/CN2013/072086, filed on Mar. 1, 2013, which claims priority to Chinese Patent Application No. 201210053628.9, filed before Chinese Patent Office on Mar. 2, 2012 and entitled "Speech Recognition Method for Instant Messaging and Terminal", which is incorporated herein by reference in its entirety.

TECHNICAL FIELD

The present disclosure relates to the field of communications, and particularly, to a speech recognition method for an instant messaging and a terminal.

BACKGROUND

With the development of network, more and more people gradually depend on mobile devices for time killing, chatting with friends and entertainment, wherein almost ¾ of users of the mobile terminals communicate with their friends through the chat tools. Currently, the speech input is increasingly popular among the dominant chat tools, which avoids the operation of repeated clicking in the conventional virtual keyboard input, and the users can communicate with each other more quickly and smoothly.

At present, most of the instant communication tools of the terminal provide the function of speech input, such as QQ setup in PC, Wechat of the mobile terminal, speech input of QQ setup in mobile, MiTalk, etc. However in many scenarios (e.g., in the meeting room or a noisy environment, or the receiver has no earphone or player, or the speech content is private, etc.), it is inconvenient for the receiver to play the speech directly when the speech is input based on the instant communication. In that case, how to enable the receiver to directly acquire the speech content is a problem always concerned by a person skilled in the art.

SUMMARY

In order to enable the receiver to directly acquire the speech content during the instant communication, the embodiments of the present disclosure provide a speech recognition method for an instant messaging and a terminal. The technical solutions are given as follows.

The embodiments of the present disclosure provide a speech recognition method for an instant messaging, including:
 receiving speech information inputted by a user;
 acquiring the current environment information, and judging whether the speech information needs to be played according to the current environment information; and
 recognizing the speech information as text information, when it is judged that the speech information needs not to be played.

Said recognizing the speech information as text information specifically includes:
 sending the speech information to a speech recognition server on the Cloud, so that the speech recognition server recognizes the speech information as text information; and
 receiving text information recognized by the speech recognition server.

Said recognizing the speech information as text information specifically includes:
 performing a speech recognition of the speech information through a built-in speech recognition module of a terminal to obtain text information.

Specifically, the current environment information is a user's operation instruction, and said judging whether the speech information needs to be played according to the current environment information specifically includes:
 judging that the speech needs not to be played when the user's operation instruction is an instruction of acquiring text information; and
 judging that the speech information needs to be played when the user's operation instruction is not an instruction of acquiring text information.

Specifically, the current environment information includes hardware information of the terminal itself, and said judging whether the speech information needs to be played according to the current environment information specifically includes:
 judging that the speech information needs to be played when the hardware information of the terminal itself meets a playing condition of the speech information; and
 judging that the speech information needs not to be played when the hardware information of the terminal itself does not meet the playing condition of the speech information.

Specifically, the current environment information includes the current noise information, and said judging whether the speech information needs to be played according to the current environment information specifically includes:
 judging whether the current noise information is within a preset range;
 judging that the speech information needs to be played when the current noise information is within the preset range; and
 judging that the speech information needs not to be played when the current noise information is not within the preset range.

The terminal is a mobile terminal or a PC terminal.

The embodiments of the present disclosure further provide a terminal, including:
 an acquisition module configured to receive speech information inputted by a user;
 a judgment module configured to acquire the current environment information, and judge whether the speech information needs to be played according to the current environment information; and
 a recognition module configured to recognize the speech information as text information when the judgment result of the judgment module is "No".

The recognition module specifically includes a sending unit and a receiving unit;
 the sending unit is configured to send the speech information to a speech recognition server on the Cloud when the judgment result of the judgment module is "No", so that the speech recognition server recognizes the speech information as text information; and
 the receiving unit is configured to receive text information recognized by the speech recognition server.

The recognition module is specifically configured to recognize the speech information as text information through a built-in speech recognition module of the terminal, when the judgment result of the judgment module is "No".

The judgment module specifically includes an acquisition unit and a judgment unit, the acquisition unit is configured to acquire a user's operation instruction; and the judgment unit is configured to judge that the speech information needs not to be played when the user's operation instruction is an instruction of acquiring text information; and judge that the speech information needs to be played when the user's operation instruction is not an instruction of acquiring text information.

The judgment module specifically includes an acquisition unit and a judgment unit;

the acquisition unit is configured to acquire hardware information of the terminal itself; and the judgment unit is configured to judge that the speech information needs to be played when the hardware information of the terminal itself meets a playing condition of the speech information; and judge that the speech information needs not to be played when the hardware information of the terminal itself does not meets the playing condition of the speech information.

The judgment module specifically includes an acquisition unit and a judgment unit;

the acquisition unit is configured to acquire the current noise information; and the judgment unit is configured to judge that the speech information needs to be played when the current noise information is within a preset range; and judge that the speech information needs not to be played when the current noise information is not within the preset range.

The terminal is a mobile terminal or a PC terminal.

The technical solutions provided in the embodiments of the present disclosure achieve the following beneficial effects:

The speech receiver is provided with a speech recognition function, when the speech information of the instant messaging is received by the terminal, thereby helping the speech receiver to normally acquire the content to be expressed by the opposite side under an inconvenient situation. For example, when it is inconvenient to play the speech at the public place or the speech cannot be played because there is no playing device, the user can quickly acquire the speech content.

BRIEF DESCRIPTION OF THE DRAWINGS

In order to more clearly describe the technical solutions of the embodiments of the present disclosure, the drawings to be used in the descriptions of the embodiments will be briefly introduced as follows. Obviously, the following drawings just illustrate some embodiments of the present disclosure, and a person skilled in the art can obtain other drawings from those drawings without paying any other creative effort.

DETAILED DESCRIPTION

In order that the objective, technical solutions and advantages of the present disclosure are clearer, the embodiments of the present disclosure will be further described in details in conjunction with the drawings.

Embodiment 1

Figure 1:
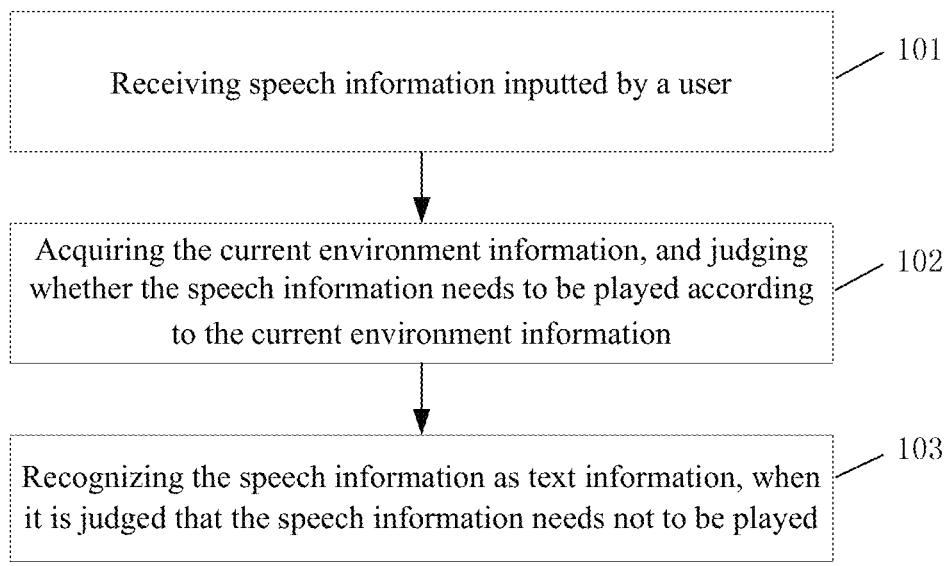
FIG. 1 is a flowchart of a speech recognition method based on an instant messaging provided by Embodiment 1 of the present disclosure.

Referring to FIG. 1, an embodiment of the present disclosure provides a speech recognition method based on an instant messaging, including:

Step 101: receiving speech information inputted by a user;

Step 102: acquiring the current environment information, and judging whether the speech information needs to be played according to the current environment information; and Step 103: recognizing the speech information as text information, when it is judged that the speech information needs not to be played.

The method provided by the embodiment of the present disclosure provides the speech receiver with a speech recognition function, when the speech information of the instant messaging is received through the terminal, so as to help the receiver to normally acquire the content to be expressed by the opposite side under an inconvenient situation. For example, when it is inconvenient to play the speech at the public place or the speech cannot be played because there is no playing device, the user can quickly acquire the speech content.

Embodiment 2

Figure 2:
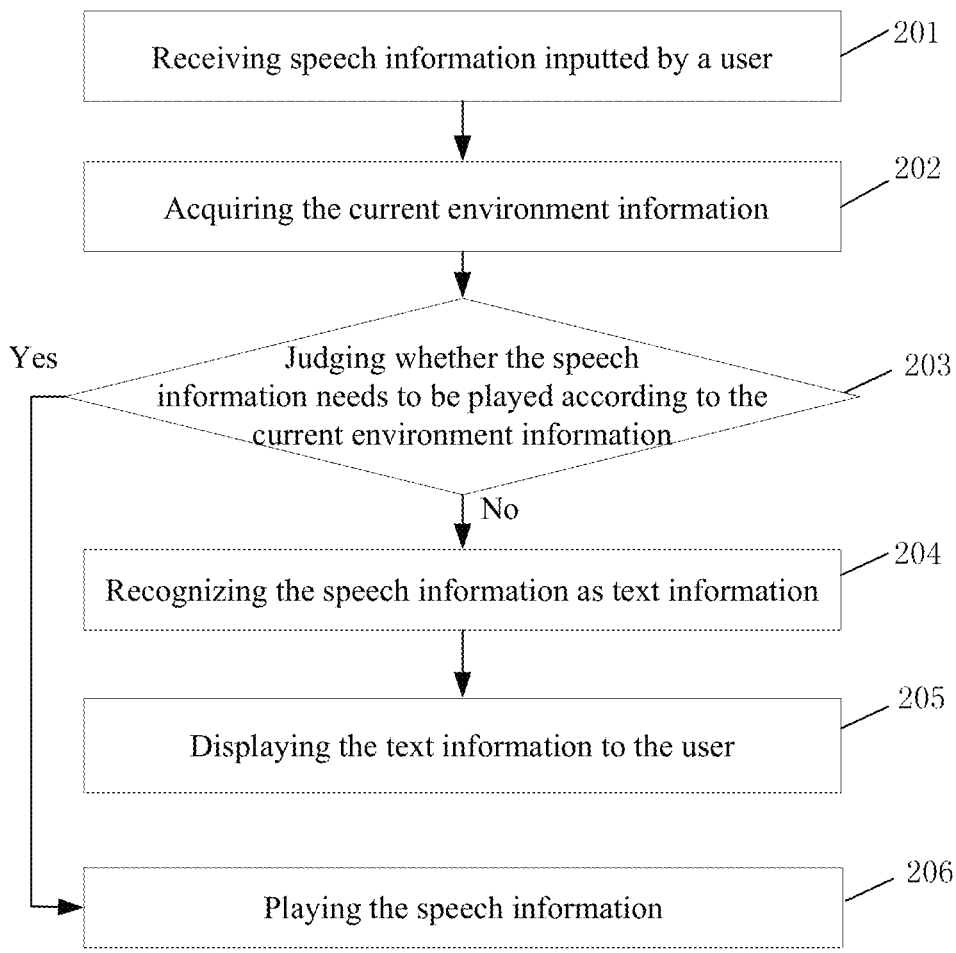
FIG. 2 is a flowchart of a speech recognition method based on an instant messaging provided by Embodiment 2 of the present disclosure.

Referring to FIG. 2, an embodiment of the present disclosure provides a speech recognition method based on an instant messaging, including:

Step 201: Receiving speech information inputted by a user.

In this step, the terminal receives the speech information inputted by the user. Specifically, the application scenario of the embodiment of the present disclosure may be that the user inputs the speech information in the instant scenario of the internet application, or the user inputs the speech information in the chat scenario.

The terminal in the embodiment of the present disclosure is a mobile terminal or a PC terminal. The mobile terminal may be a cell phone, a Personal Digital Assistant (PDA), a Mobile Internet Device (MID), etc.

Step 202: Acquiring the current environment information.

In this step, the current environment information in the embodiment of the present disclosure may be the hardware information of the terminal itself, the user's operation instruction, or the current noise information, and so on. The specific content of the current environment information is not limited in the embodiment of the present disclosure.

The hardware information of the terminal itself includes, but not limited to, information of a hardware device (e.g., an audio input or output device connected through an interface) currently installed at the terminal. The hardware information may further include drive information of the audio input or output device (e.g., an audio codec, an audio device driver, etc.), and so on.

The user's operation instruction may be any operation instruction issued for the terminal, and different operation instructions may be corresponding to different functions depending on the settings of the technician in the development. For example, a clicking operation on the speech information may be an operation instruction for playing the speech information, while a clicking operation on an option of acquiring text information corresponding to the speech information may be an operation instruction for acquiring text information.

The current noise information is noise information of an environment where the terminal is located. For example, when the terminal is currently located in a meeting room, the current noise information is noise information in the meeting room. Correspondingly, acquiring the current environment information is to acquire the current noise information, which may be performed by a microphone of the terminal. The specific process is similar to that of acquiring the speech, and herein is omitted.

To be noted, the type of the acquired environment information may be a default setting of the technician, or adjusted by the user during usage. For different types of environment information, the specific judging processes are different, please see step 203 for the details.

Step 203: Judging whether the speech information needs to be played according to the current environment information, and if not, performing step 204, otherwise performing step 206.

The speech input really brings a quicker and smoother communication process to the user. But in many scenarios (e.g., in a meeting room or a noisy environment, or the receiver has no earphone or player, or the speech content is private, etc.), it is inconvenient for the receiver to play the speech. In that case, in order to enable the receiver to successfully acquire the speech content to be expressed by the speech sender, the speech information may be recognized as text information for the receiver's convenience of selection. The receiver may select to play the speech information, or view the recognized text information.

In this step, the mode of judging whether the speech information needs to be played varies with the current environment information, and the embodiment of the present disclosure provides the following modes.

Mode 1: the current environment information is the user's operation instruction.

Judging whether the speech information needs to be played according to the current environment information specifically includes: judging whether the operation instruction is an instruction of acquiring text information; if the operation instruction is an instruction of acquiring text information, judging that the speech information needs not to be played, and performing step 204; and if the operation instruction is not an instruction of acquiring text information, judging that the speech information needs to be played, and performing step 206.

Specifically, the user reads the speech information received at the terminal by performing the operation instruction, which may be a clicking operation or a touching operation and herein is not limited. The terminal judges the mode selected by the user for information acquisition according to the user's operation instruction. In which, after receiving the user's operation instruction, the terminal judges whether the speech information needs to be played according to the operation instruction; if it is not necessary to play the speech information for the user, the speech information is recognized as text information and provided to the user; and if it is necessary to play the speech information for the user, the speech information is directly played for the user, without performing any other special processing operation.

For example, the terminal is provided with at least two buttons A and B, wherein button A displays characters such as "speech" and "horn shape", and button B displays characters such as "text" and "ABC". When the user clicks or touches button A, it means that the speech information is acquired and shall be played; when the user clicks or touches button B, it means that the text information is acquired and shall be displayed.

Mode 2: the current environment information is hardware information of the terminal itself.

The hardware information of the terminal capable of playing the speech information at least includes an audio codec and an audio output device.

Judging whether the speech information needs to be played according to the current environment information specifically includes: judging whether the hardware of the terminal itself includes both an audio codec and an audio output device; if the hardware information of the terminal itself includes both an audio codec and an audio output device, the hardware information of the terminal itself meets the playing condition of the speech information; in that case, it is judged that the speech information needs to be played, and step 206 is performed; if the hardware information of the terminal itself does not include an audio codec or it does not include an audio output device, or neither an audio codec nor an audio output device is included by the hardware, the hardware information of the terminal itself does not meet the playing condition of the speech information; in that case, it is judged that the speech information needs not to be played, and step 204 is performed.

Mode 3: the current environment information is the current noise information.

A certain noise range, such as 30-90 dB, is preset in the present disclosure. Judging whether the speech information needs to be played according to the current environment information, specifically including: judging whether the current noise information is within the preset range; if the current noise information is within the preset range, judging that the speech information needs to be played, and performing step 206; and if the current noise information is not within the preset range, it means that the current environment is a quiet environment or a very noisy environment, then judging that the speech information needs not to be played, and performing step 204.

The relation among mode 1, mode 2 and mode 3 is "or". In the practical application, the implementation is made by adopting mode 1, or the implementation is made by adopting mode 2 or the implementation is made by adopting mode 3, or the priorities of the three modes may be set and the implementation is made according to their priorities. The mode adoption may be a default setting of the technician, or adjusted by the user during usage.

Step 204: Recognizing the speech information as text information.

Specifically, in the embodiment of the present disclosure, the speech information may be recognized as text information on the Cloud, or by a locally building-in recognition module, which is not limited herein.

When the speech information is recognized as text information on the Cloud, the terminal sends the speech information to a speech recognition server on the Cloud to perform a speech recognition, wherein on the Cloud means being in the network, and the speech recognition server on the Cloud means the speech recognition server in the network. Next, the speech recognition server transmits the recognition result to the terminal, and the terminal receives text information recognized by the speech recognition server. The terminal transmits the speech information to a specified speech recognition server in the network, which can recognize one or more kinds of speech information.

When the locally built-in recognition module recognizes the speech information as text information, the terminal performs a speech recognition of the speech information through the built-in speech recognition of the terminal, to obtain text information. The terminal has a built-in speech recognition module when installing the instant messaging tool, and when the terminal wants to recognize the speech information, it only needs to directly perform a speech recognition of the speech information to be recognized using the module, and directly provide the recognition result to the user.

In the embodiment of the present disclosure, whether the Cloud recognition or the locally built-in recognition module needs to adopt the speech recognition technology, such as Google, Baidu and iFLY, which is not limited in the embodiments of the present disclosure, provided that the speech information can be recognized as text information.

The solution of the present disclosure will be described as follows in two scenarios, i.e., the mobile terminal and the PC terminal.

Figure 3:
FIG. 3 is a schematic diagram of a speech recognition in an instant messaging under a mobile terminal in Embodiment 2 of the present disclosure.

The mobile terminal scenario: in the scenario of the instant messaging chat of the mobile terminal, as illustrated in FIG. 3, a function key "text" is tailed after the speech information. When the user clicks the key, it means that the user's operation instruction is an instruction of acquiring text information, and in that case, the mobile terminal recognizes the speech information as text information.

Figure 4:
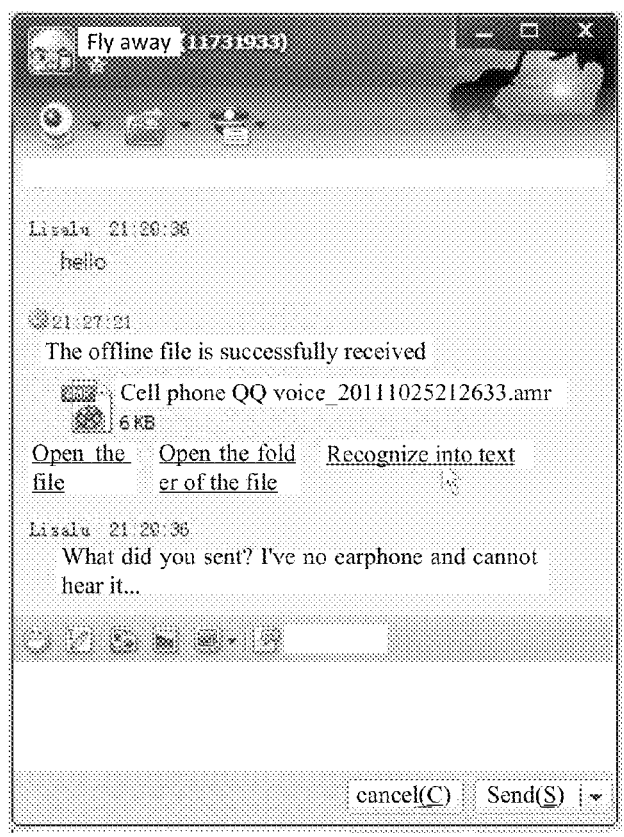
FIG. 4 is a schematic diagram of a speech recognition in an instant messaging under a PC in Embodiment 2 of the present disclosure.

The PC terminal scenario: in the scenario of the instant messaging chat of the PC terminal, as illustrated in FIG. 4, a function key "recognizing as text" is tailed after the speech information. When the user clicks the key, it means that the user's operation instruction is an instruction of acquiring text information, and in that case, the PC terminal recognizes the speech information as text information.

Step 205: Displaying the text information to the user.

After the speech information is recognized as text information, the text information is displayed on a terminal screen.

To be noted, the text information may be displayed individually in a specified area, or by covering the original display area of the speech information, and the in-situ display provides a more direct visual effect.

Step 206: Playing the speech information.

Specifically, when judging that the speech information needs to be played, the terminal directly plays the speech information.

The method provided by the embodiment of the present disclosure provides the speech receiver with a speech recognition function, when the speech information of the instant messaging is received through the terminal, so as to help the receiver to normally acquire the content to be expressed by the opposite side under an inconvenient situation. For example, when it is inconvenient to play the speech at the public place or the speech cannot be played because there is no playing device, the user can quickly acquire the speech content.

Embodiment 3

Figure 5:
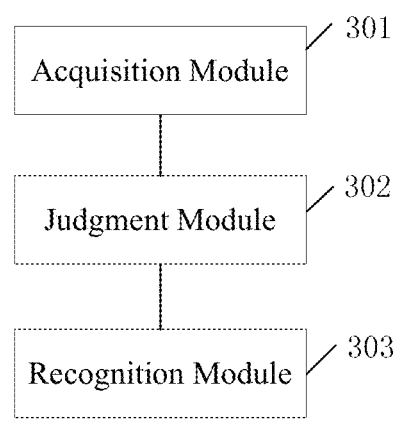
FIG. 5 is a schematic diagram of the structure of a terminal provided by Embodiment 3 of the present disclosure.

Referring to FIG. 5, the embodiment of the present disclosure provides a terminal, including:
an acquisition module 301, configured to receive speech information inputted by a user;
a judgment module 302, configured to acquire the current environment information, and judge whether the speech information needs to be played according to the current environment information; and
a recognition module 303, configured to recognize the speech information as text information when the judgment result of the judgment module 302 is "No".

The recognition module 303 specifically includes a sending unit and a receiving unit;
the sending unit configured to send the speech information to a speech recognition server when the judgment result of the judgment module 302 is "No", so that the speech recognition server recognizes the speech information as text information; and
the receiving unit configured to receive text information recognized by the speech recognition server.

The recognition module 303 is specifically configured to recognize the speech information as text information through a built-in speech recognition module of the terminal, when the judgment result of the judgment module 302 is "No".

Figure 6:
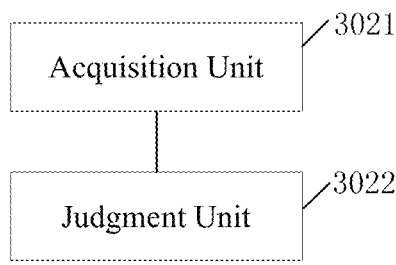
FIG. 6 is a schematic diagram of the structure of a judgment module in the terminal provided by Embodiment 3 of the present disclosure.

Referring to FIG. 6, the judgment module 302 specifically includes an acquisition unit 3021 and a judgment unit 3022;
the acquisition unit 3021 configured to acquire a user's operation instruction; and
the judgment unit 3022 configured to judge that the speech information needs not to be played when the user's operation instruction is an instruction of acquiring text information; and judge that the speech information needs to be played when the user's operation instruction is not an instruction of acquiring text information.

The judgment module 302 specifically includes an acquisition unit 3021 and a judgment unit 3022;
the acquisition unit 3021 configured to acquire hardware information of the terminal itself; and
the judgment unit 3022 configured to judge that the speech information needs to be played when the hardware information of the terminal itself meets a playing condition of the speech information; and judge that the speech information needs not to be played when the hardware information of the terminal itself does not meets the playing condition of the speech information.

The judgment module 302 specifically includes an acquisition unit 3021 and a judgment unit 3022;
the acquisition unit 3021 configured to acquire the current noise information; and
the judgment unit 3022 configured to judge that the speech information needs to be played when the current noise information is within a preset range; and judge that the speech information needs not to be played when the current noise information is not within the preset range.

Specifically, the terminal is a mobile terminal or a PC terminal. The mobile terminal may be a cell phone, a Personal Digital Assistant (PDA), a Mobile Internet Device (MID), etc.

The terminal provided by the embodiment of the present disclosure, by providing the speech receiver with a speech recognition function, when the speech information of the instant messaging is received through the terminal, helps the receiver to normally acquire the content to be expressed by the opposite side under an inconvenient situation. For example, when it is inconvenient to play the speech at the public place or the speech cannot be played because there is no playing device, the user can quickly acquire the speech content.

The terminal provided by the embodiment may specifically belong to the same conception as the method embodiment. For the detailed implementation process, please refer to the method embodiment, and herein is omitted.

A person skilled in the art shall appreciate that all or a part of the steps of the above embodiments may be performed through hardware, or by instructing relevant hardware through a program, and the program may be stored in a computer readable storage medium. The mentioned storage medium may be a Read-Only Memory (ROM), a magnetic disk, an optical disk, etc.

The above descriptions are just preferred embodiments of the present disclosure, rather than limiting the present disclosure. Any amendment, equivalent replacement, improvement, etc. made under the spirit and principle of the present disclosure shall fall within the protection scope of the present disclosure.

What is claimed is:

1. A speech recognition method for an instant messaging, characterized in that the method comprises:
    receiving speech information inputted by a user;
    acquiring the current environment information, and judging whether the speech information needs to be played according to the current environment information;
    playing the speech information in response to determining that the speech information needs to be played;
    recognizing the speech information as text information, when it is judged that the speech information needs not to be played; and
    displaying the text information in response to determining that the speech information needs not to be played,
    wherein the current environment information specifically comprises the current noise information, and said judging whether the speech information needs to be played according to the current environment information specifically comprises:
        judging whether the current noise information is within a preset range;
        judging that the speech information needs to be played when the current noise information is within the preset range; and
        judging that the speech information needs not to be played when the current noise information is not within the preset range.

2. The method according to claim 1, wherein said recognizing the speech information as text information specifically comprises:
    sending the speech information to a speech recognition server on Cloud, so that the speech recognition server recognizes the speech information as text information; and
    receiving text information recognized by the speech recognition server.

3. The method according to claim 1, wherein said recognizing the speech information as text information specifically comprises:
    performing a speech recognition of the speech information through a built-in speech recognition module of a terminal to obtain text information.

4. The method according to claim 1, wherein the current environment information is specifically a user's operation instruction, and said judging whether the speech information needs to be played according to the current environment information specifically comprises:
    judging that the speech information needs not to be played when the user's operation instruction is an instruction of acquiring text information; and
    judging that the speech information needs to be played when the user's operation instruction is not an instruction of acquiring text information.

5. The method according to claim 1, wherein the current environment information specifically comprises hardware information of a terminal itself, and said judging whether the speech information needs to be played according to the current environment information specifically comprises:
    judging that the speech information needs to be played when the hardware information of the terminal itself meets a playing condition of the speech information; and
    judging that the speech information needs not to be played when the hardware information of the terminal itself does not meet the playing condition of the speech information.

6. A terminal, including a processor and a memory, characterized in that the terminal comprises:
    an acquisition module configured to receive speech information inputted by a user;
    a judgment module configured to acquire the current environment information, and judge whether the speech information needs to be played according to the current environment information;
    a recognition module configured to recognize the speech information as text information when the judgment result of the judgment module is "No";
    wherein the judgment module specifically comprises an acquisition unit and a judgment unit;
    the acquisition unit is configured to acquire the current noise information; and
    the judgment unit is configured to judge that the speech information needs to be played when the current noise information is within a preset range; and judge that the speech information needs not to be played when the current noise information is not within the preset range, and
    wherein the processor is configured to:
        play the speech information in response to the judgment unit determining that the speech information needs to be played; and
        cause the text information to be displayed in response to determining that the speech information needs not to be played.

7. The terminal according to claim 6, wherein the recognition module specifically comprises a sending unit and a receiving unit;
    the sending unit is configured to send the speech information to a speech recognition server on Cloud when the judgment result of the judgment module is "No", so that the speech recognition server recognizes the speech information as text information; and
    the receiving unit is configured to receive text information recognized by the speech recognition server.

8. The terminal according to claim 6, the recognition module is specifically configured to recognize the speech information as text information through a built-in speech recognition module of the terminal, when the judgment result of the judgment module is "No".

9. The terminal according to claim 6, wherein the judgment module specifically comprises an acquisition unit and a judgment unit,
    the acquisition unit is configured to acquire a user's operation instruction; and
    the judgment unit is configured to judge that the speech information needs not to be played when the user's operation instruction is an instruction of acquiring text information; and judge that the speech information needs to be played when the user's operation instruction is not an instruction of acquiring text information.

10. The terminal according to claim 6, wherein the judgment module specifically comprises an acquisition unit and a judgment unit;

the acquisition unit is configured to acquire hardware information of the terminal itself; and the judgment unit is configured to judge that the speech information needs to be played when the hardware information of the terminal itself meets a playing condition of the speech information; and judge that the speech information needs not to be played when the hardware information of the terminal itself does not meets the playing condition of the speech information.

11. The terminal according to claim 6, wherein the terminal is a mobile terminal or a PC terminal.

* * * * *